United States Patent Office 3,632,783
Patented Jan. 4, 1972

3,632,783
TREATMENT OF MOSQUITO BITES EMPLOYING CERTAIN TETRAALKYL DIAMIDES
Joseph E. Stonis, Palos Park, Ill., assignor to The C. P. Hall Company of Illinois, Chicago, Ill.
No Drawing. Filed May 27, 1969, Ser. No. 828,385
Int. Cl. A61l 23/00
U.S. Cl. 424—320                                    11 Claims

ABSTRACT OF THE DISCLOSURE

Relief from mosquito bites on humans is obtained by applying to the surface of the bite area a diamide of the formula

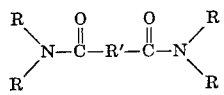

in which each R is a saturated or unsaturated aliphatic hydrocarbon group of 1 to 6 carbon atoms and R′ is a saturated or unsaturated aliphatic hydrocarbon group of 0 to 22 carbon atoms.

---

The invention relates more particularly to the treatment of mosquito bites on humans. It is probably also applicable to the treatment of the bites of other insects. The irritation is alleviated almost immediately by application to the surface of the bite area of a diamide of the formula

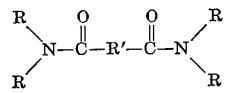

in which each R is a saturated or unsaturated aliphatic hydrocarbon group (straight or branched chain or cyclo) of 1 to 6 carbon atoms. R′ is essentially a saturated or unsaturated aliphatic hydrocarbon group of 0 to 22 carbon atoms. It is essentially a straight-chain group. Chains with a hydroxy substituent are equivalent.

Thus, one may use a diamide of oxalic, malonic, succinic, glutaric, maleic, adipic, pimelic, suberic, azelaic, sebacic, undecanoic, dodecanoic, octadecylic or eicosanoic acid, etc., provided the total number of carbons in the diamide does not exceed about 20. Isomers of these acids may also be used, such as iso-sebacic acid, iso-glutaric, iso-adipic, etc. Tricarboxylic acids, such as tricarballic acid are equivalent, as are acids which include a hydroxy group such as ricinoleic acid.

Preferred compounds are N,N,N′,N-tetramethyl diamides of succinic and glutaric acids. Other diamides which may be used include:

N,N,N′,N′-tetrabutyldiamide of oxalic acid
N,N,N′,N′-tetra-n-butyl diamide of malonic acid
N,N-dibutynylamide-N′,N′-diallylamide of malonic acid
N,N-di-n-butyl amide-N′,N′-diethyl amide of succinic acid
N,N-dimethylamide-N′,N′-dibutylamide of succinic acid
N,N,N′,N′-tetramethyl diamide of glutaric acid
N,N,N′,N′-tetramethyl diamides of iso-glutaric acids
N,N,N′,N′-tetraallyl diamide of glutaric acid
N,N-dimethylamide-N′,N′-dibutylamide of glutaric acid
N,N,N′,N′-tetramethyl diamide of adipic acid
N,N-di(methylethyl)-N′,N′-dimethyl diamide of adipic acid
N,N,N′,N′-tetramethyl diamides of iso-adipic acids
N,N-dimethylamide-N,N′-dibutylamide of adipic acid
N,N-dimethyl-N′,N′-dihexyl diamide of pimelic acid
N,N,N′,N′-tetra-isopropyl diamide of azelaic acid
N,N-dimethyl-N′,N′-dihexyl diamide of azelaic acid
N,N,N′,N′-tetraallyl diamide of azelaic acid
N,N-di-n-butyl-N′,N′-dihexyl amide of sebacic acid
N,N,N′,N′-tetramethyl diamide of iso-sebacic acids
N,N,N′,N′-tetra-isopropyl diamide or brassylic acid The diamide is preferably applied as a solution (usually 5 to 20 percent, but it may be 1 to 95 percent) in water. This may include a water-miscible alcohol, such as isopropanol or ethanol, or the alcohol may be used undiluted. The solution is applied in any manner, as by spraying or swabbing the bite area. Alternatively, the diamide may be applied as a powder (which may be diluted with an inert, e.g. scented talc) in which case the moisture of the skin will dissolve the diamide and cause it to penetrate the skin. The diamide may be used in stick form or as a paste or salve. It may also be dissolved in a cosmetic base, a cream or oil, and added to other solutions or sprays applied to the skin such as insect repellants, sunscreen lotions, and ointments and creams useful in the treatment of rashes and allergies, and in topical anesthetics used for the relief of pain and itching of sunburn.

A single application is usually all that is required, but the application may be repeated if that seems desirable.

In the examples that follow, the tests which were made were not laboratory tests using a select group of mosquitoes but were field tests in which the insects were of the common variety found in the Midwest. The subjects were volunteers.

EXAMPLE 1

Subject had been working in his garden in the evening and had received numerous bites, some of which were mosquito bites, around the arms and neck. A 5 percent solution of N,N,N′,N′-tetramethyl succindiamide in water was sprayed onto the bitten parts of the skin, and within one minute the itching and irritation of the bites disappeared.

EXAMPLE 2

Subject was working in her back yard and was bitten extensively on her back and arms. She had been wearing a low-backed dress and the next day her skin was red and irritated by the number of mosquito bites which was estimated at about 30 or 40. A 5 percent solution of N,N,N′,N′-tetramethyl glutardiamide was applied and within a period of 30 seconds the plain and irritation disappeared.

EXAMPLE 3

Subject had been hiking in the woods dressed in a T-shirt and walking shorts. During the hiking, he received numerous mosquito and other insect bites. Complaining that he needed relief because of the irritation, he was sprayed with an aerosol spray which contained isopropyl alcohol, propellant, hexadecyl alcohol, and N,N,N′,N′-tetraethyl adipdiamide. Shortly after he was sprayed with the above mixture, the pain and irritation from insect bites disappeared.

EXAMPLE 4

Subject had been playing tennis and during and after the tennis match received numerous bites, the majority of which were from mosquitoes. After application of a 5 percent solution of N,N,N′,N′-tetramethyl sebacadiamide in mineral oil, he reported that the pain and irritation of the bites had disappeared after a period of about 5 minutes.

In the above examples, the subject in all cases received almost immediate relief from the pain and itching of insect bites and, furthermore, reported that the effect on the skin was such as to give a pleasant sensation.

The invention is covered in the claims which follow.

I claim:
1. The method of relieving the irritation caused by an insect bite on a human which comprises applying to the surface of the bite area a substantial amount of a di-dialkylamide of the formula

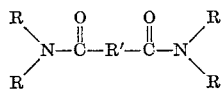

in which each R is a saturated or unsaturated aliphatic hydrocarbon group of 1 to 6 carbon atoms, and R' is a saturated or unsaturated aliphatic hydrocarbon group of 0 to 22 carbon atoms, which amount is sufficient to relieve the irritation.

2. The process of claim 1 in which the diamide is a tetramethyl diamide.
3. The process of claim 1 in which the diamide is a tetra-alkyldiamide of succinic acid.
4. The process of claim 1 in which the diamide is a tetra-alkyldiamide of glutaric acid.
5. The process of claim 1 in which the diamide is a tetra-alkyldiamide of adipic acid.
6. The process of claim 1 in which the diamide is a tetra-alkyldiamide of sebacic acid.
7. The process of claim 1 in which the tetra-alkyldiamide is the tetra-methyldiamide of glutaric acid.
8. The process of claim 1 in which the diamide is applied as a water solution.
9. The process of claim 1 in which the diamide is applied as an alcohol solution.
10. The process of claim 1 in which the diamide is applied as a mineral oil solution.
11. The process of claim 2 in which the diamide is applied as a water solution.

References Cited
UNITED STATES PATENTS 3,005,747 10/1961 Jacobi et al. _____ 424—320
3,288,794 11/1966 Kuceski _____ 260—561
3,312,620 4/1967 Low et al. _____ 260—561

ALBERT T. MEYERS, Primary Examiner
V. D. TURNER, Assistant Examiner